(12) United States Patent
Chen

(10) Patent No.: US 7,496,009 B2
(45) Date of Patent: Feb. 24, 2009

(54) METHOD AND APPARATUS FOR DETECTING BCA ON AN OPTICAL DISC

(75) Inventor: Chin-Tai Chen, Tao-Yuan Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 576 days.

(21) Appl. No.: 11/164,489

(22) Filed: Nov. 24, 2005

(65) Prior Publication Data

US 2007/0115777 A1    May 24, 2007

(51) Int. Cl.
*G11B 20/10* (2006.01)
*G11B 27/36* (2006.01)

(52) U.S. Cl. .............. 369/47.22; 369/47.28; 369/47.19; 369/53.31

(58) Field of Classification Search .............. 369/47.27, 369/47.28, 47.32, 47.19, 53.25, 53.5, 53.34, 369/47.54, 47.22, 59.23
See application file for complete search history.

(56) References Cited

U.S. PATENT DOCUMENTS

| 6,414,920 | B1 | 7/2002 | Lee | |
|---|---|---|---|---|
| 6,618,333 | B1 | 9/2003 | Chou et al. | |
| 6,708,299 | B1 | 3/2004 | Xie | |
| 6,950,379 | B2 * | 9/2005 | Yen et al. | 369/47.28 |
| 7,082,082 | B2 * | 7/2006 | Tomita | 369/47.27 |
| 7,116,615 | B2 * | 10/2006 | Yen | 369/47.35 |
| 7,209,641 | B2 * | 4/2007 | Noro | 386/125 |

\* cited by examiner

*Primary Examiner*—Thang V Tran
(74) *Attorney, Agent, or Firm*—Winston Hsu

(57) ABSTRACT

A method and an apparatus for detecting BCA on the surface of an optical disc are disclosed. The method includes utilizing an internal free running clock to detect a sync pattern, starting demodulation of data on detection of sync ID 1 by utilizing the internal free running clock, and utilizing the transition between row boundaries to determine which sync ID 1 was used for initializing demodulation.

24 Claims, 4 Drawing Sheets

METHOD AND APPARATUS FOR DETECTING BCA ON AN OPTICAL DISC

BACKGROUND OF THE INVENTION

1. Field of the Invention

The present invention relates to reproduction of recorded data on an optical disc, and more particularly, to a method and apparatus of detecting the BCA of an optical disc.

2. Description of the Prior Art

The latest DVD discs comprise an area known as a burst cutting area (BCA), which is an annular area near the center of the disc, containing ID codes and manufacturing information recorded after the end of the disc manufacturing process. The purpose of the code recorded in the BCA is to form a link between the content of the disc and the software to be used with that disc. The BCA is a series of stripes in a bar code like shape on the surface of the disc, formed utilizing a high power laser to partially remove an aluminum reflective layer of the disc.

Please refer to FIG. 1, which is a table illustrating a BCA structure according to the prior art. The BCA structure consists of a BCA preamble, a data field including information data, an error detection code (EDC) $EDC_{BCA}$, an error correction code (ECC) $ECC_{BCA}$, and a BCA postamble. The BCA preamble includes a sync byte $SB_{BCA}$ and four following bytes $PR_0$-$PR_3$. The sync byte $SB_{BCA}$ contains a fixed sync pattern and a specific sync code, where the sync code has a sync ID 0. The sync byte $SB_{BCA}$ indicates the start position of the BCA. The information data field consists of information blocks, each comprising 4 resync bytes $RS_{BCA1}, \ldots, RS_{BCAn}$ having the same sync ID, and 16 information bytes, wherein each resync byte $RS_{BCA1}, \ldots, RS_{BCAn}$ includes a fixed sync pattern and a specific sync code, and is followed by four information bytes respectively. For example, four information bytes $I_0$, $I_1$, $I_2$, $I_3$ follow the resync byte $RS_{BCA1}$. According to the BCA specification, the sync byte $SB_{BCA}$ and the resync bytes $RS_{BCA1}$-$RS_{BCA15}$ have the same fixed sync pattern expressed in channel bits as "01000110". The error detection code $EDC_{BCA}$ consists of 4 bytes $D_0$, $D_1$, $D_2$, $D_3$, and the error correction code $ECC_{BCA}$ consists of 16 bytes $C_{0,0}$-$C_{3,3}$, where resync bytes $RS_{BCA13}$ with sync ID 13 precede the error correction code $ECC_{BCA}$. The postamble having four bytes $P0_0$-$P0_3$ is preceded by a resync byte $RS_{BCA14}$ with sync ID 14 and followed by a resync byte $RS_{BCA15}$ with sync ID 15.

As mentioned above, the sync byte $SB_{BCA}$ is used to indicate the start of the BCA. Once it has been detected, demodulating of the BCA can begin. The prior art uses a phase locked loop (PLL) to extract a clock that is synchronized with the BCA bit cycle, in order to detect the sync byte. The data processor detects the fixed sync pattern based on the generated clock, and then determines whether or not the sync ID is 0. Once the start position of the BCA has been confirmed (i.e. ID of the detected sync pattern is determined to be 0) and data acquisition has begun, the data processor can begin to decode the acquired data. As shown in FIG. 1, the data bytes between the BCA preamble and the BCA postamble are extracted and decoded. In addition, the EDC procedure is activated to check if error bits exist by utilizing the $EDC_{BCA}$, and the ECC procedure is activated to correct error bits of the decoded BCA data.

The system can only begin to decode data when the sync byte $SB_{BCA}$ is detected; if the sync byte $RS_{BCA}$ cannot be detected due to some defects, decoding cannot take place. Furthermore, the PLL must be synchronized with the BCA channel bit cycle in order to detect the sync byte $SB_{BCA}$, so any deviation from this synchronization will also cause the decoding operation to fail.

SUMMARY OF THE INVENTION

It is therefore one of the objectives of the present invention to provide a method and apparatus for reading BCA data of an optical disc without detecting the sync byte of sync ID 0, to solve the above-mentioned problem.

Briefly described, the method comprises: detecting a sync pattern using an internal clock of the BCA data processor by clocking consecutive falling edges of a read BCA signal; determining the sync ID following the detected sync pattern; beginning data demodulation once a resync byte having sync ID 1 has been detected; buffering demodulated data; determining which information rows have not been acquired by using the address of row boundaries; and error correcting for these information rows.

An apparatus for acquiring BCA data is also disclosed. Briefly described, the apparatus comprises a sync detection unit for determining when a sync pattern is detected, and utilizing this detection to begin demodulation for the BCA data; a channel bit demodulation unit for demodulating the BCA data; a data buffer for storing the demodulated data; and an EDC/ECC unit for carrying out error correction.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
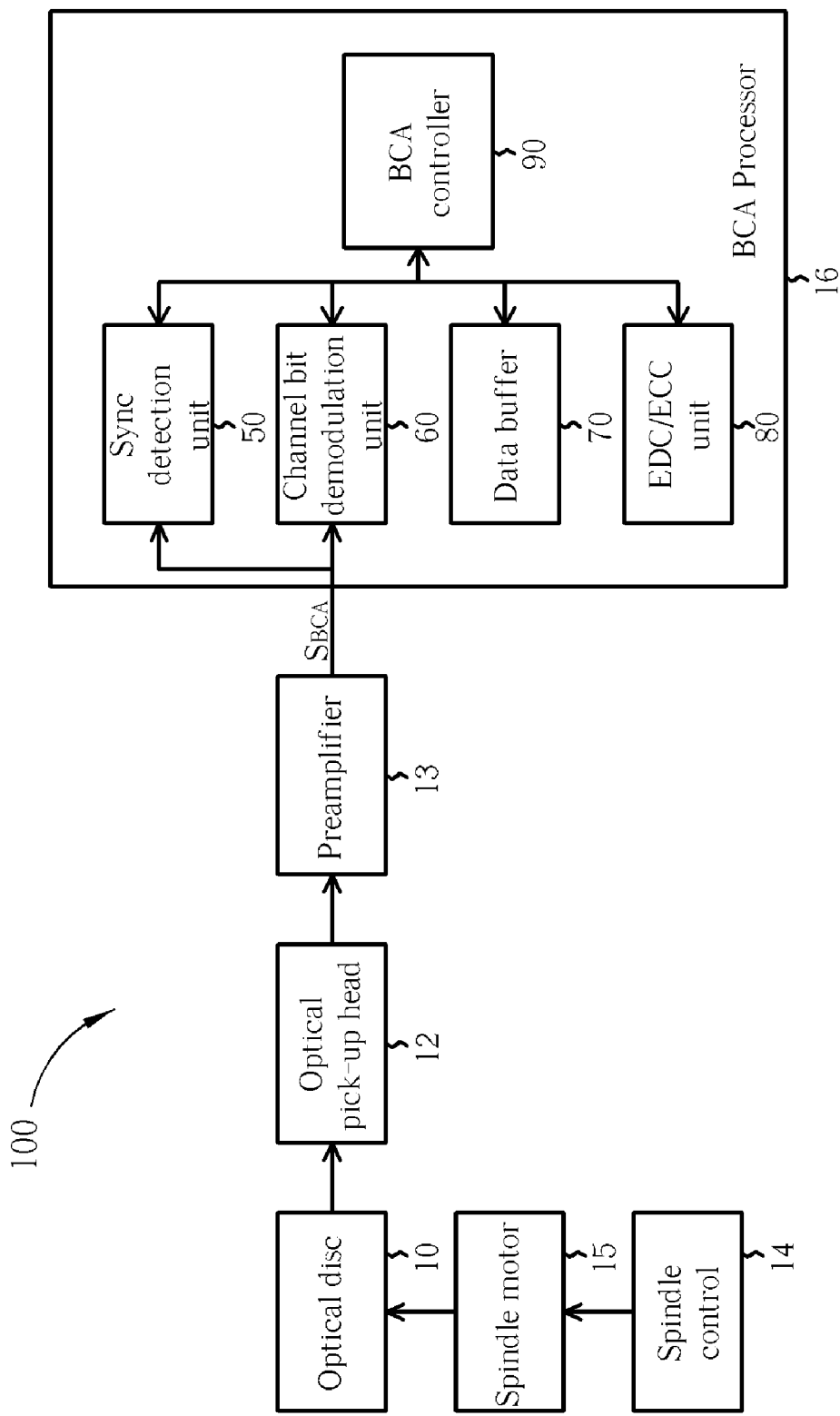
FIG. 2 is a diagram illustrating an optical disc drive according to an embodiment of the present invention.

Please refer to FIG. 2. FIG. 2 is a diagram illustrating an optical disc drive 100 according to an embodiment of the present invention. Please note that only the components related to BCA data retrieval are shown in FIG. 2. The optical disc drive 100 has an optical pick-up head 12; a preamplifier 13; a spindle control 14; a spindle motor 15; and a BCA processor 16. The spindle control 14 drives the spindle motor 15 to rotate an optical disc 10 at a constant angular velocity (CAV mode) or constant linear velocity (CLV mode). The optical pick-up head 12 emits laser beams onto the optical disc 10 and reads a signal from the BCA area of the optical disc 10. The preamplifier 13 then equalizes and slices it into a BCA signal $S_{BCA}$ for the BCA processor 16. In this embodiment, the BCA processor 16 has a sync detection unit 50, a channel bit demodulation unit 60, a data buffer 70, an EDC/ECC unit 80, and a BCA controller 90. Please note that the BCA processor 16 operates under a clock having a free running frequency that depends on the rotation speed of the optical disc 10 driven by the spindle motor 15 but does not need to be synchronized with the BCA bit cycle. The spindle rotation rate and the counter rate (rate of the clock) are both predetermined so they do not need to be synchronized with each other.

Figure 3:
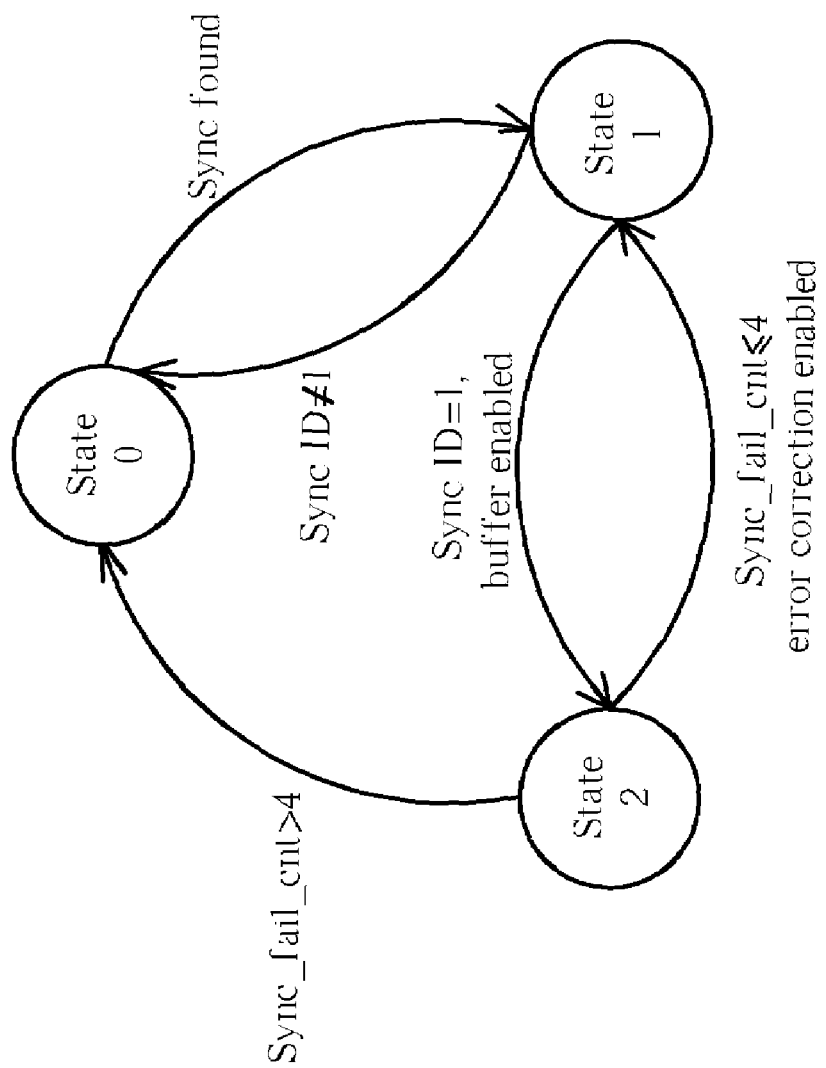
FIG. 3 illustrates a state machine of a BCA processor shown in FIG. 2.
Figure 4:
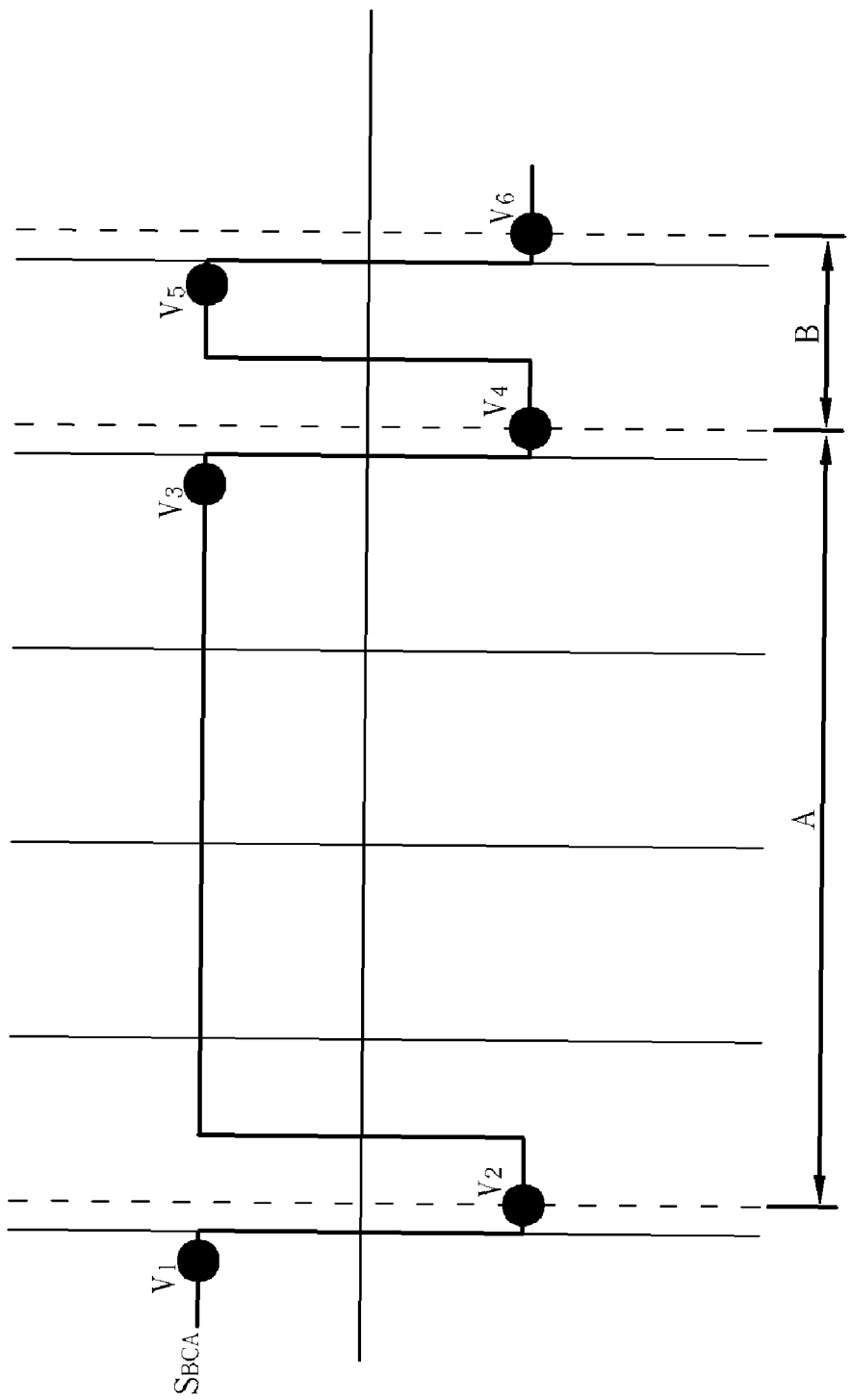
FIG. 4 is a diagram of the sync pattern as detected by a sync detection unit utilizing a free running clock.

The sync detection unit 50 utilizes the free running clock for clocking consecutive falling edges of the BCA signal SBCA read from the BCA area of the optical disc 10. According to the known BCA specification, the sync byte $SB_{BCA}$ and the resync bytes $RB_{BCA1}$-$RB_{BCA15}$ each have a fixed sync pattern preceding a specific sync ID. The fixed sync pattern has a distinctive pattern of falling edges, so when this pattern is detected, it can be determined by the BCA processor 16 that a sync pattern has been found. The sync detection unit 50 samples the signal outputted from the preamplifier 13 according to the free running clock. Please further refer to FIG. 3 and FIG. 4. FIG. 3 illustrates a state machine of the BCA processor 16 shown in FIG. 2. FIG. 4 is a diagram of the sync pattern as detected by the sync detection unit 50 utilizing the free running clock. State 0 is the state in which the BCA processor 16 attempts to detect a sync pattern. In this embodiment, by the rigger of the free running clock the sync detection unit 50 monitors if a level transition occurs. As shown in FIG. 4, two consecutive sampled values $V_1$ and $V_2$ differ, meaning that a falling edge of the BCA signal occurs. For example, the sampled value $V_1$ corresponds to logic level "0", while the sampled value $V_2$ corresponds to logic level "1". By the same means, a falling edge of the BCA signal $S_{BCA}$ is detected when the sync detection unit 50 detects that two consecutive sampled values $V_3$ and $V_4$ correspond to logic levels "0" and "1", respectively. Later, another falling edge of the BCA signal $S_{BCA}$ is also detected when the sync detection unit 50 detects that two consecutive sampled values $V_5$ and $V_6$ correspond to logic levels "0" and "1", respectively.

The first falling edge to falling edge period is denoted as A, and the second falling edge to falling edge period is denoted as B. In this embodiment, the sync detection unit 50 counts how many clock cycles of the free running clock are within the period A, and counts how many clock cycles of the free running clock are within the period B. Based on the BCA specification, the period A is four times as great as the period B. Because the free running clock is utilized to detect the fixed sync pattern, the sync detection unit 50 applies a condition for examining the occurrence of the fixed sync pattern. In other words, the falling edges must fulfill a condition |A−4B|<threshold_1, where B>threshold_2, for it to be determined that a sync pattern has been detected. Therefore, the sync pattern is deemed detected only when the difference between the counter number of the period A and the counter number of the period B multiplied by four falls in a range delimited by +threshold_1 and −threshold_1, and the counter number of the period B is greater than threshold_2. Please note that the counter in the sync detection unit 50 should be properly designed to prevent overflow when counting the clock cycles for the longer period A.

Once a sync pattern has been detected by the sync detection unit 50, the BCA controller 90 monitors bits following the detected sync pattern. The BCA controller 90 enables the channel bit demodulation unit 60 to start demodulating channel bits into data bits. If the detected sync ID is 1, the BCA controller 90 enables the data buffer 70 to start buffering demodulated information outputted from the channel bit demodulation unit 60. The demodulation of the channel bits is described as follows. The internal free running clock of the BCA processor 16 is used for demodulating data. As the sync pattern has been detected utilizing the free running clock of the BCA processor 16, the timing for demodulating data is known from the detected sync pattern. For example, a floor value of the counter number of period A divided by four, i.e. floor (A/4), serves as a basic period N for reading the channel bits. In the channel bit demodulation unit 60 the demodulating clock is maintained at a period 0~1N, and the counter observes the sliced BCA signal for bit count (bit_cnt) 0~79, as each information row contains 80 bits of information. Consecutive falling edges in the BCA signal will be obtained as low-level points. Using a threshold, these points are sliced into channel bits of "0"s or "1"s. Each pair of channel bits is then demodulated into a data bit, according to the modulation rules, where (1 0)=1, and (0 1)=0, and the data will be erased if the related pair of channel bits violate the predetermined modulation rules. Since how to convert channel bits into data bits is known to those skilled in this art, detailed description is omitted for brevity.

If the sync ID is not 1, however, the BCA controller 90 will interrupt the channel bit demodulation unit 60 to wait for another sync pattern detected by the sync detection unit 50. Once it has been confirmed that a sync pattern having an associated sync code with an ID of 1 has been detected, a general demodulating and buffering operation will take place (State 1). The BCA controller 90 enables the channel bit demodulation unit 60 and the data buffer 70 to start performing channel bit demodulation and buffering demodulated information outputted from the channel bit demodulation unit 60. The BCA data is demodulated and buffered until the last information row having sync ID 13 is ready in the data buffer 70. At this point, the BCA processor will proceed to State 2, where the EDC/ECC unit 80 will actuate error detection in conjunction with error correction.

In this embodiment, each row that is demodulated and buffered is given an ID_idx address, which is the address of the data buffer 70 that saves the demodulated data bytes. The first row that is detected with a sync ID of 1 is given an ID_idx address (row address) of 0, the next demodulated row is given an ID_idx address of 1, and so on. If a sync pattern cannot be detected for one row period then the next row that is detected will be given an ID_idx address increased by one. This is so when error correction is carried out, the information rows that were originally undetected can be stored in the correct address in the buffer, so all information is stored consecutively. Error correction is carried out when the last row having sync ID 13 (ID_idx_last) is ready in the data buffer 70. The last row of sync ID 13, in this embodiment, can be detected by observing the row boundary transition between sync ID 13 and 14, or by the row boundary transition between sync ID 14 and 15. It is necessary to detect the last row having sync ID 13 in order to determine the ECC length n (where n is an integer such that n=1~12).

Figure 1:
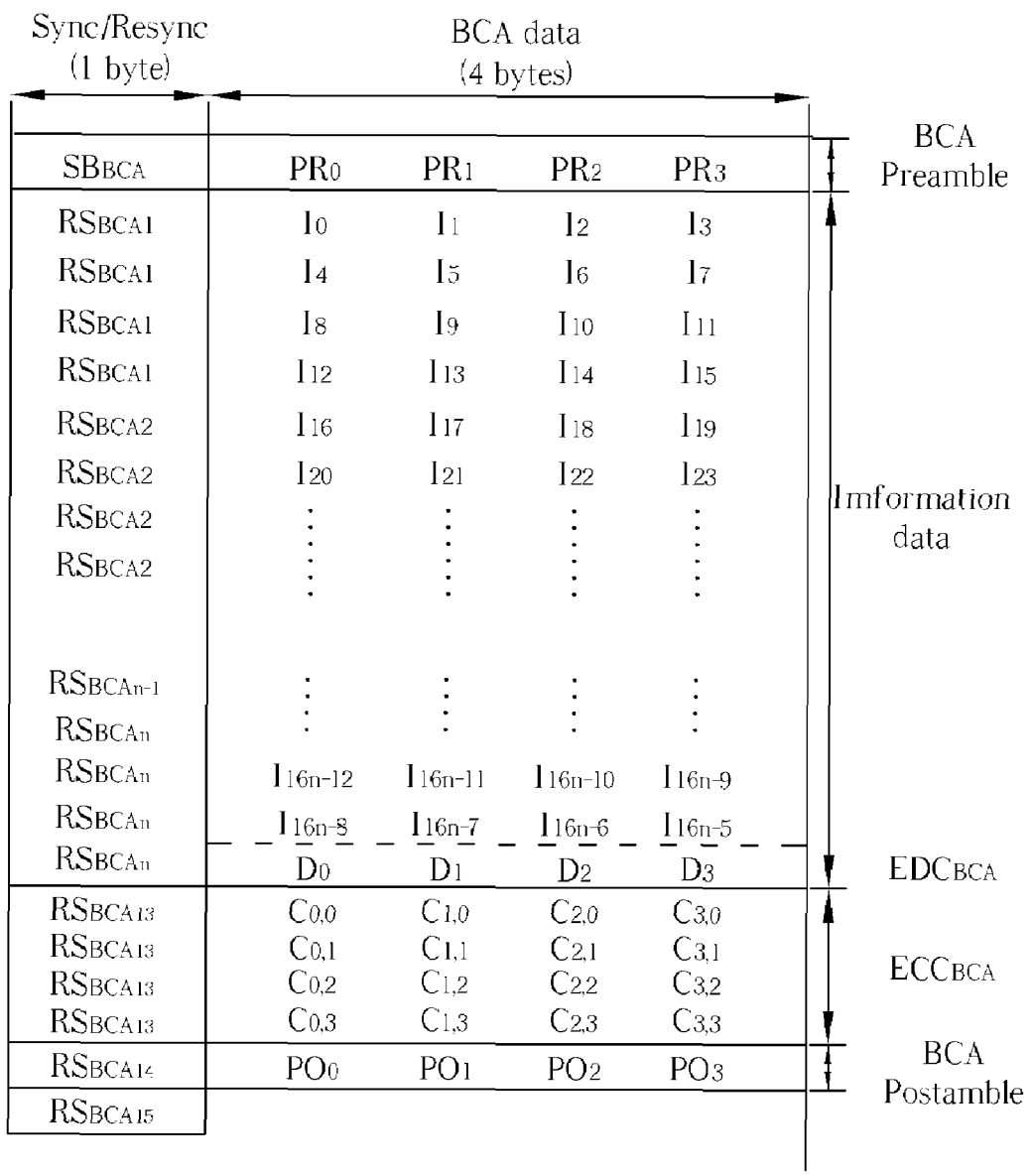
FIG. 1 is a table illustrating a BCA structure according to the prior art.

If the sync ID 1 used for beginning demodulation of channel bits is not the first sync ID 1 of the information data field shown in FIG. 1, it can be determined which sync ID 1 has been detected by looking at the boundary between sync ID 1 and sync ID 2. If the transition between row boundaries occurs at 1, 1, 1, 2, 2 etc. it is known that the sync ID 1 that initiated data decoding is the second sync ID 1, and therefore the first row having sync ID 1 has not been detected. Once all subsequent data rows with sync IDs from 1 to 13 have been buffered in the data buffer 70, the BCA controller 90 activates the EDC/ECC unit 80 (State 2). The ECC block $ECC_{BCA}$ shown in FIG. 1 can carry out error correction for up to four bytes of information. Therefore, the missing first data row having the sync ID 1 can be correctly recovered through error correction. In this case, the BCA processor will go back to State 1, and carry out a demodulating and buffering operation for the originally undetected bytes of information. However, if more than four data rows are missing due to defects or other factors (Sync_fail_cnt>4), the error correction fails and the BCA processor 16 will go back to State 0; otherwise, the BCA processor 16 returns to State 1. After entering State 0 from State 2, the BCA processor 16 restarts retrieving of the BCA data from the optical disc 10 according to the above-mentioned procedure. In this embodiment, as the BCA is relatively wide, the pick-up head 12 can be moved further out from the center of the optical disc 10 to read the BCA one more time.

In contrast to the prior art, the present invention can begin demodulation and buffering of data on detection of sync ID 1, rather than sync ID 0, therefore effectively increasing the chance of starting demodulating and buffering data by four. In addition, the present invention does not require an external PLL to clock the data retrieving but uses an internal clock both for detecting a sync pattern and for demodulating data, which does not need to be synchronized with the BCA bit cycle, significantly decreasing the complexity of operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for acquiring data from a burst cutting area (BCA) on an optical disc, the method comprising:
   reading a BCA signal from the optical disc;
   detecting a sync pattern from the read BCA signal utilizing a free running clock;
   determining whether the sync pattern has a predetermined sync ID; and
   when the sync pattern has the predetermined sync ID, demodulating information following the sync pattern and buffering demodulated information.

2. The method of claim 1, wherein a frequency range of the free running clock depends on a rotation speed of the optical disc.

3. The method of claim 1, wherein the predetermined sync ID is 1.

4. The method of claim 3, wherein any one of a plurality of sync IDs having the predetermined sync ID is capable of being utilized for starting demodulating the information.

5. The method of claim 1, wherein the step of detecting the sync pattern farther comprises:
   utilizing the free running clock to count a plurality of periods of the read BCA signal and utilizing the periods to identify the sync pattern.

6. The method of claim 5, wherein the periods are falling edge to falling edge periods of the read BCA signal.

7. The method of claim 5, wherein the step of utilizing the periods to identify the sync pattern further comprises:
   identifying the sync pattern by checking whether a difference between a first period and a second period multiplied by a predetermined factor is less than a first threshold, and whether the second period is greater than a second predetermined threshold.

8. The method of claim 7, wherein the predetermined factor is 4.

9. The method of claim 1, wherein the step of demodulating the information following the sync pattern further comprises:
   utilizing the free running clock to demodulate the information following the sync pattern.

10. The method of claim 1, further comprising:
    utilizing a transition between two different sync IDs to determine which sync pattern having the predetermined sync ID was detected for starting demodulating the information, wherein one of the sync IDs has the same ID as the predetermined sync ID.

11. The method of claim 1, further comprising:
    utilizing a transition between sync IDs 13 and 14 or between sync IDs 14 and 15 to determine an end of ECC data in the buffered information; and
    starting processing error correction for the buffered information once the end of the ECC data has been determined.

12. An apparatus for acquiring data from a burst cutting area (BCA) of an optical disc, the apparatus comprising:
    a sync detection unit capable of detecting a sync pattern from a BCA signal read from the optical disc utilizing a free running clock;
    a BCA controller, coupled to the sync detection unit, for determining whether the sync pattern has a predetermined sync ID;
    a channel bit demodulation unit, coupled to the optical pick-up head and the BCA controller, for demodulating information following the sync pattern when the sync pattern has the predetermined ID; and
    a data buffer, coupled to the channel bit demodulation unit, for buffering demodulated information outputted from the channel bit demodulation unit.

13. The apparatus of claim 12, wherein a frequency range of the free running clock depends on a rotation speed of the optical disc.

14. The apparatus of claim 12, wherein the predetermined sync ID is 1.

15. The apparatus of claim 14, wherein when detecting any one of a plurality of sync IDs having the predetermined sync ID, the BCA controller drives the channel bit demodulation unit to start demodulating the information.

16. The apparatus of claim 12, wherein the BCA controller utilizes the free running clock to count a plurality of periods of the read BCA signal and utilizes the periods to identify the sync pattern.

17. The apparatus of claim 16, wherein the BCA controller further identifies the sync pattern by checking whether a difference between a first period and a second period multiplied by a predetermined factor is less than a first threshold, and whether the second period is greater than a second predetermined threshold.

18. The apparatus of claim 16, wherein the periods are falling edge to falling edge periods of the read BCA signal.

19. The apparatus of claim 17, wherein the predetermined factor is 4.

20. The apparatus of claim 12, wherein the channel bit demodulation unit utilizes the free running clock to demodulate the information following the sync pattern.

21. apparatus of claim 12, wherein the BCA controller further utilizes a transition between two different sync IDs to determine which sync pattern having the predetermined sync ID was detected for starting demodulating the information, where one of the sync IDs has the same ID as the predetermined sync ID.

22. The apparatus of claim 12, wherein the BCA controller further utilizes a transition between sync IDs 13 and 14 or between sync IDs 14 and 15 to determine an end of ECC data in the buffered information; and the apparatus further comprises:
    an ECC unit, coupled to the data buffer and the BCA controller, for starting processing error correction for the buffered information once the end of the ECC data has been determined by the BCA controller.

23. The apparatus of claim 12, wherein the sync detection unit detects the sync pattern from the BCA signal read from the optical disc utilizing a free running clock.

24. The apparatus of claim 12, wherein the channel bit demodulation unit demodulates information following the sync pattern when the BCA controller detects that the sync pattern has the predetermined sync ID.

* * * * *